(12) United States Patent
Furmanek et al.

(10) Patent No.: US 11,499,726 B2
(45) Date of Patent: Nov. 15, 2022

(54) COAXIAL GAS VALVE ASSEMBLIES INCLUDING ELECTRONICALLY CONTROLLED SOLENOIDS

(71) Applicant: EMERSON ELECTRIC CO., St. Louis, MO (US)

(72) Inventors: Daniel L. Furmanek, Ballwin, MO (US); Mark Stark, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 723 days.

(21) Appl. No.: 16/579,512

(22) Filed: Sep. 23, 2019

(65) Prior Publication Data

US 2021/0080122 A1  Mar. 18, 2021

Related U.S. Application Data

(60) Provisional application No. 62/901,498, filed on Sep. 17, 2019.

(51) Int. Cl.
*F16K 1/12* (2006.01)
*F24D 19/10* (2006.01)
(Continued)

(52) U.S. Cl.
CPC ........... *F24D 19/1084* (2013.01); *F16K 1/12* (2013.01); *F16K 1/443* (2013.01);
(Continued)

(58) Field of Classification Search
CPC .. F16K 1/443; F16K 31/0655; F16K 31/0693; F16K 1/12; F23N 1/005;
(Continued)

(56) References Cited

U.S. PATENT DOCUMENTS 2,324,642 A * 7/1943 Peterson ............. F16K 31/0655
251/76
3,606,241 A * 9/1971 Bornholdt ........... F16K 31/0693
251/52
(Continued)

OTHER PUBLICATIONS

Åström, Karl Johan, PID Control, Copyright 2002, 36 pages.
(Continued)

*Primary Examiner* — Umashankar Venkatesan
(74) *Attorney, Agent, or Firm* — Harness, Dickey & Pierce, P.L.C.; Anthony G. Fussner (57) ABSTRACT

A coaxial gas valve assembly includes a gas inlet, a gas outlet, a valve tube, and a shaft member. A main valve is movable between a closed position and an open position (broadly, openable and closable). A main spring is positioned to resiliently bias the main valve in its closed position. A redundant valve is movable between a closed position and an open position (broadly, openable and closable). A redundant spring is positioned to resiliently bias the redundant valve in its closed position. A solenoid coil is positioned to electromagnetically move the shaft member within the valve tube. A balance diaphragm is connected to the valve tube. A gas path through at least the valve tube allows gas flow from a first side of the balance diaphragm to a second side of the balance diaphragm to reduce a pressure difference between the first and second sides of the balance diaphragm.

14 Claims, 5 Drawing Sheets

(51) Int. Cl.
  *F16K 1/44* (2006.01)
  *F16K 31/06* (2006.01)
  *F23N 1/00* (2006.01)
  *F23N 5/24* (2006.01)
  *F24D 5/04* (2006.01)
  *G05D 16/20* (2006.01)

(52) U.S. Cl.
  CPC .......... *F16K 31/0655* (2013.01); *F23N 1/005* (2013.01); *F23N 5/245* (2013.01); *F24D 5/04* (2013.01); *G05D 16/2022* (2019.01); *F23N 2241/02* (2020.01)

(58) Field of Classification Search
  CPC .... F23N 5/245; F23N 2241/02; F24D 19/084; F24D 5/24; G05D 16/2022
  USPC .................................................... 251/129.07
  See application file for complete search history.

(56) References Cited

U.S. PATENT DOCUMENTS

| | | | |
|---|---|---|---|
| 4,452,424 A | 6/1984 | Kawata | |
| 4,694,812 A * | 9/1987 | Wendt | F02M 26/48 |
| | | | 123/568.27 |
| 4,830,332 A * | 5/1989 | Miura | F16K 31/0655 |
| | | | 251/129.17 |
| 4,951,916 A | 8/1990 | Kanameda et al. | |
| 5,307,774 A * | 5/1994 | Hammer | F16K 1/443 |
| | | | 123/585 |
| 6,047,718 A * | 4/2000 | Konsky | F16K 31/0603 |
| | | | 335/265 |
| 7,011,110 B1 | 3/2006 | Stark | |
| 8,539,978 B2 | 9/2013 | Santinanavat et al. | |
| 8,714,460 B2 | 5/2014 | Santinanavat et al. | |
| 8,746,275 B2 | 6/2014 | Santinanavat et al. | |
| 8,813,776 B2 | 8/2014 | Stark et al. | |
| 9,032,991 B2 | 5/2015 | Broker et al. | |
| 9,038,658 B2 | 5/2015 | Santinanavat et al. | |
| 9,416,888 B2 * | 8/2016 | Keber | F16K 27/00 |
| 10,007,273 B2 * | 6/2018 | Martino | G05D 7/0635 |
| 10,041,401 B2 * | 8/2018 | Lenk | F02M 35/10157 |
| 10,139,839 B2 * | 11/2018 | Loeffler | F16K 1/443 |
| 10,161,360 B2 * | 12/2018 | Ninomiya | F02M 21/0233 |
| 2013/0306894 A1 * | 11/2013 | Wei | F16K 31/0655 |
| | | | 251/359 |
| 2014/0360484 A1 * | 12/2014 | Stark | F16K 37/0058 |
| | | | 73/705 |
| 2021/0156491 A1 * | 5/2021 | Arakawa | F16K 31/0655 |

OTHER PUBLICATIONS

Wu, Dongrui; P-Map: An Intuitive Plot to Visualize, Understand, and Compare Variable-Gain PI Controllers, accessed Jul. 2, 2019, 10 pages.

Basilio et al., Design of PI and PID Controlllers With Transient Performance Specification, Copyright 2002, IEEE, 7 pages.

* cited by examiner

COAXIAL GAS VALVE ASSEMBLIES INCLUDING ELECTRONICALLY CONTROLLED SOLENOIDS

CROSS-REFERENCE TO RELATED APPLICATION

This application claims the benefit and priority of U.S. Provisional Application No. 62/901,498 filed Sep. 17, 2019, which is incorporated herein by reference in its entirety.

FIELD

The present disclosure generally relates to coaxial gas valve assemblies including electronically controlled solenoids, particularly with pressure balance diaphragms.

BACKGROUND

This section provides background information related to the present disclosure which is not necessarily prior art.

Gas valves are used in HVAC systems to selectively supply gas to a burner of a furnace, etc. Existing coaxial solenoid-based pressure regulator valves may be functional only in a limited range. Mechanical servo-regulator or direct-acting regulator systems may use separate redundant solenoid valves for sealing and stepper-motor modulation. For example, mechanical servo-regulator or direct-acting regulator systems may include coaxial redundant solenoid valves for sealing and stepper-motor modulation. In some systems, an electronically controlled voice-coil valve with separate solenoid for redundant sealing.

DRAWINGS

The drawings described herein are for illustrative purposes only of selected embodiments and not all possible implementations, and are not intended to limit the scope of the present disclosure.

Corresponding reference numerals indicate corresponding (though not necessarily identical) parts throughout the several views of the drawings.

DETAILED DESCRIPTION

Example embodiments will now be described more fully with reference to the accompanying drawings.

As recognized herein, mechanical systems may require extra devices to provide redundant gas valve sealing, and may require significant additional complexity to achieve modulation of gas flow through the gas valve assembly. Previous coaxial solenoid-based pressure regulator valves can achieve modulation in only a limited range of flows and pressures.

Example embodiments are disclosed herein that include modulating gas valve assemblies for providing a modulated gas outlet flow/pressure (e.g., to a burner of an HVAC system component, etc.). For example, a coaxial G valve, J valve, etc. may be modified to operate as a solenoid controlled modulating gas valve.

A balance diaphragm may be positioned between inner and outer coaxial tubes of a gas valve assembly. The balance diaphragm may have an operating diameter slightly larger than a seal diameter of a redundant valve of the gas valve assembly.

A gas path may be defined within the inner coaxial tube to allow pressure to equalize between a volume behind the balance diaphragm (with respect to the valve seals) and a volume between the two valve seals. This pressure provides lift on the redundant valve to compensate for pressure differential between the inlet and the downstream side of the redundant valve (e.g., by reducing the pressure differential to approximately zero, or slightly more or less than zero).

A redundant valve spring may provide a sufficient force to seal inlet pressures at an inlet of the gas valve assembly, up to 3 pounds per square inch (psi), between 3 psi and 5 psi, above 5 psi, etc. This redundant valve spring force may be significantly higher than a rated ½ psi of the gas valve assembly.

The balance provided by this gas valve assembly including the balance diaphragm may allow the modulating system to regulate a significantly wider range of flows and pressures (including LP pressures) than a coaxial unit that does not include a balance diaphragm.

If a higher inlet pressure than the redundant valve rating (e.g., 3-5 psi, etc.) is encountered, the redundant valve may open temporarily, sending pressure to the main valve. The main valve may be designed to accept a significantly higher pressure than the redundant valve, without the main valve failing.

The pressure may then feed through a passage (e.g., the gas flow path through the inner coaxial tube) to the back of the diaphragm. This rebalance of pressures may allow the redundant spring to reclose the redundant valve, and may prevent overpressure from damaging the balance diaphragm as the balance diaphragm may only briefly experience more than 5 psi differential.

As explained above, the gas path may allow the incoming gas pressure to travel up the coaxial assembly and to the other side of the balance diaphragm, so that the incoming gas pressure acts on both sides of the diaphragm to substantially cancel out the incoming gas pressure.

This enables the spring force (which is directed to close the valve), to act against the electromagnetic force generated by the solenoid (which opens the valve), in a pure manner, thereby enabling stable operation at extreme gas flow pressures. Without this gas flow path and balance diaphragm construction, the force generated by the gas pressure causes the total force acting in the spring/solenoid system to flip-flop, and makes controlling the system very difficult and subject to oscillation. Using the balance diaphragm and gas flow path as disclosed in example embodiments herein may make the system more monotonic and controllable.

In addition, the gas path may be located at a position that inhibits leakages of gas from the gas inlet to the gas outlet in the event of a ruptured balance diaphragm (e.g., the gas path may inhibit a rupture in the balance diaphragm from becoming a body leak or a through leak).

Figure 1:
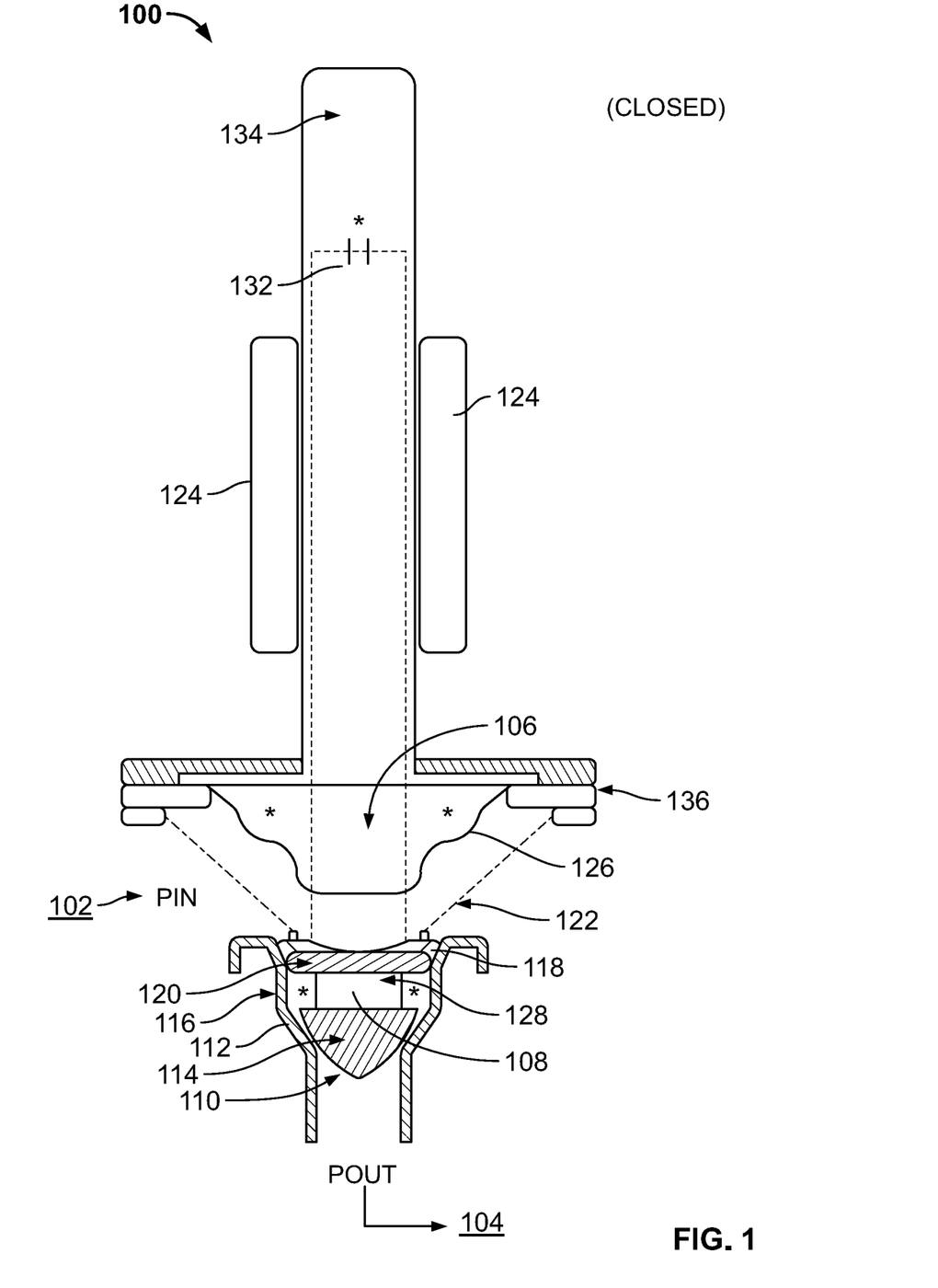
FIG. 1 is a cross-sectional view of a gas valve assembly according to an example embodiment of the present disclosure.
Figure 2:
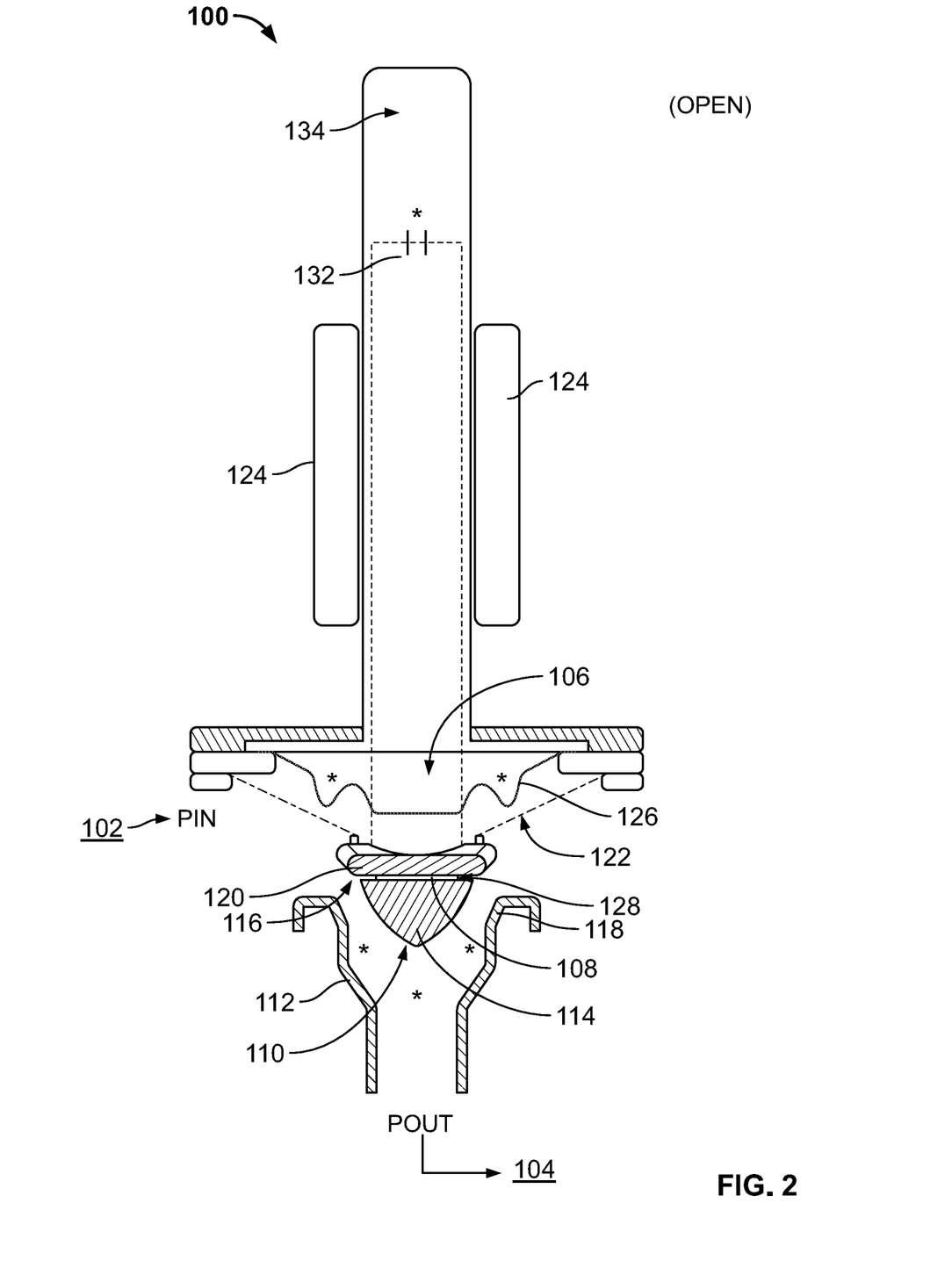
FIG. 2 is a cross-sectional view of the gas valve assembly of FIG. 1, with the valves in an open position.
Figure 3:
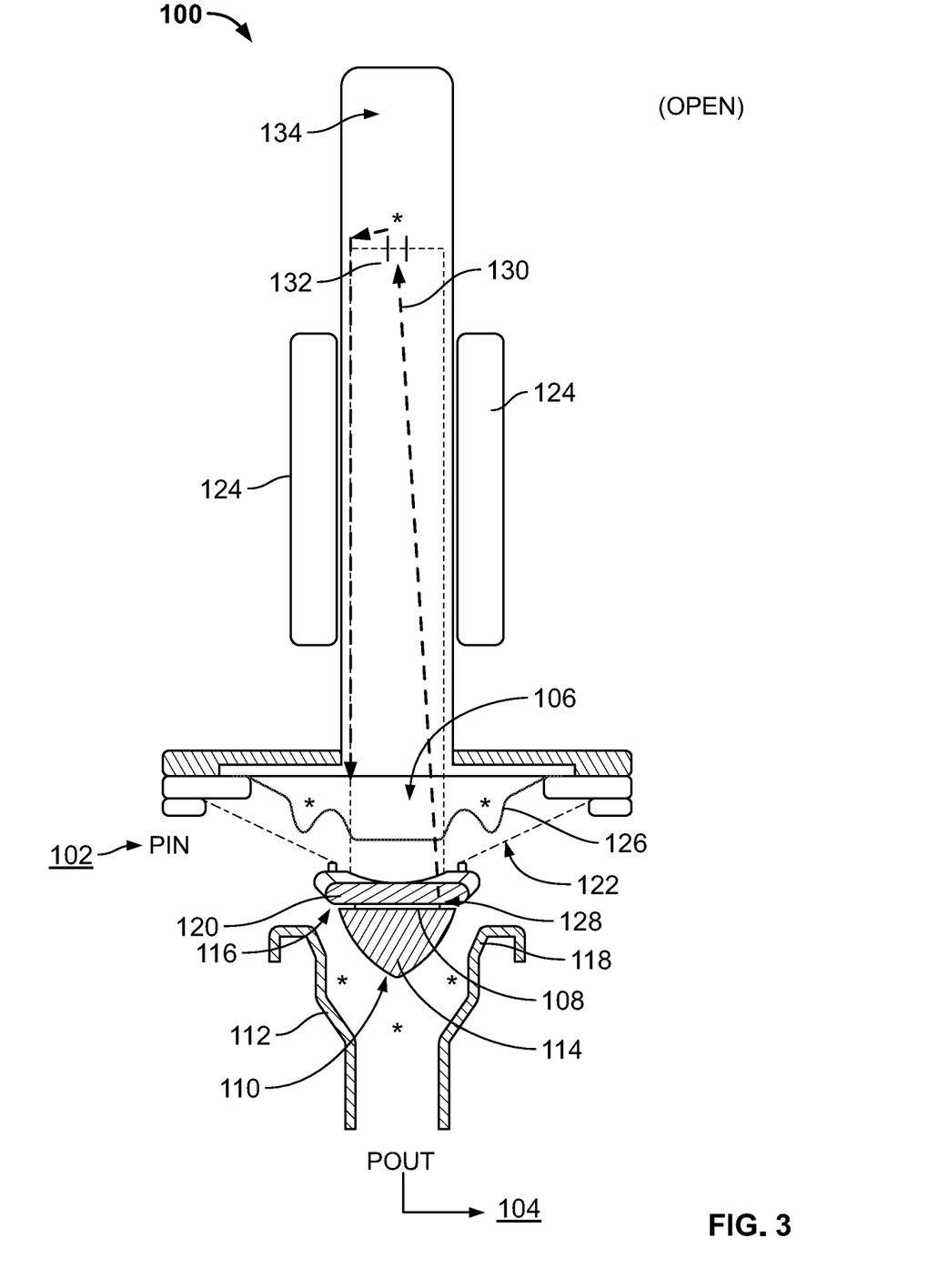
FIG. 3 is a cross-sectional view of the gas valve assembly of FIG. 2, illustrating a gas flow path through the valve tube.

Referring now to the figures, FIGS. 1-3 illustrate an exemplary embodiment of a coaxial gas valve assembly 100 embodying one or more aspects of the present disclosure.

The coaxial gas valve assembly 100 includes a gas inlet 102, a gas outlet 104, and a valve tube 106.

A shaft member 108 is positioned at least partially within the valve tube 106 (e.g., at least partially enclosed by the valve tube 106, at least partially housed by the valve tube 106, at least partially surrounded by the valve tube 106, etc.). The shaft member 108 is movable relative to the valve tube 106 (e.g., the shaft member 108 may move up and down, back and forth, etc., within the valve tube 106).

The gas valve assembly 100 includes a main valve 110 including a main valve seat 112 and a main valve member 114 positioned on the shaft member 108. The main valve member 114 is movable between a closed position and an open position. In the closed position, the main valve member 114 abuts the main valve seat 112 (e.g., contacts the main valve seat 112, forms a fluid seal with the main valve seat 112, etc.) to inhibit gas flow through the main valve 110. In the open position, the main valve member 114 is spaced apart from the main valve seat 112 to permit gas flow through the main valve 110.

FIG. 1 illustrates the main valve 110 in its closed position, with the main valve member 114 abutting the main valve seat 112 to inhibit gas flow from the gas inlet 102 to the gas outlet 104. A main spring (not shown) is positioned to resiliently bias the main valve 110 in its closed position. For example, the main spring may be compressed and positioned along the shaft member 108, in contact with the main valve member 114 at a first end of the main spring, etc., to push the main valve member 114 towards the main valve seat 112.

The gas valve assembly 100 also includes a redundant valve 116. The redundant valve 116 includes a redundant valve seat 118 and a redundant valve member 120. The redundant valve member 120 is positioned on the valve tube 106 (e.g., coupled to an end of the valve tube 106, etc.).

The redundant valve member 120 is movable between a closed position and an open position. In the closed position, the redundant valve member 120 abuts the redundant valve seat 118 to inhibit gas flow through the redundant valve 116. In the open position, the redundant valve member 120 is spaced apart from the redundant valve seat 118 to permit gas flow through the redundant valve 116.

FIG. 1 illustrates the redundant valve 116 in its closed position, with the redundant valve member 120 abutting the redundant valve seat 118 to inhibit gas flow from the gas inlet 102 to the gas outlet 104. A redundant spring 122 positioned to resiliently bias the redundant valve 116 in its closed position. For example, the redundant spring 122 may be compressed and coupled to the redundant valve member 120, the valve tube 106, etc., at a first end of the redundant spring 122, to push the redundant valve member 120 towards the redundant valve seat 118.

The gas valve assembly 100 also includes a solenoid coil 124. The solenoid coil 124 is positioned to electromagnetically move the shaft member 108 within the valve tube 106 according to an energization state of the solenoid coil 124, to open the main valve 110 and the redundant valve 116 to permit gas flow from the gas inlet 102 to the gas outlet 104.

For example, as illustrated in FIG. 2, energizing the solenoid coil 124 may move the shaft member 108 to overcome the force of the main spring, to lift the main valve member 114 off of the main valve seat 112. The main valve member 114 may contact the redundant valve member 120 and continue to move upwards to overcome the force of the redundant spring 122 and lift the redundant valve member 120 off of the redundant valve 116. When the main and redundant valve members 114 and 120 are lifted off of their respective main and redundant valve seats 112 and 118, gas may flow through the main valve 110 and the redundant valve 116.

The gas valve assembly 100 further includes a balance diaphragm 126 connected to the valve tube 106. The balance diaphragm 126 includes a first side in fluid communication with the gas inlet 102 and/or the gas outlet 104, and a second side opposite the first side. A gas path through at least the valve tube 106 allows gas flow from the first side of the balance diaphragm 126 to the second side of the balance diaphragm 126 to reduce a pressure difference between the first and second sides of the balance diaphragm 126.

FIG. 3 illustrates an example gas path 130 through the coaxial gas valve assembly 100. As shown in FIG. 1, an opening 128 allows gas to flow though the valve tube 106. The opening 128 may be a clearance around the shaft member 108 between an outer circumference of the shaft member 108 and an inner circumference of the valve tube 106, etc. The opening 128 may be positioned between the main valve member 114 and the redundant valve member 120 when the main valve 110 and the redundant valve 116 are in their respective closed positions (e.g., the opening 128 may be located where at an end of the valve tube 106 along the shaft member 108, etc.).

As shown in FIG. 3, the gas path 130 allows gas flow into the opening 128 and through the valve tube 106 to the second side of the balance diaphragm 126 to reduce the pressure difference between the first and second sides of the balance diaphragm 126.

For example, the redundant valve 116 is positioned on a first end of the valve tube 106, and the valve tube 106 may include a vent 132 at a second end of the valve tube 106 opposite the first end. The gas path 130 may allow gas flow out of the valve tube 106 via the vent 132, to the second side of the balance diaphragm 126, to reduce the pressure difference between the first and second sides of the balance diaphragm 126. Although the vent 132 is illustrated at a second end of the valve tube 106, in other embodiments the vent 132 could be located at other positions on the valve tube 106, such as a side of the valve tube 106, etc.

The gas valve assembly 100 may include an outer shell 134 positioned to at least partially surround the second end of the valve tube 106. The gas path 130 may allow gas flow from the valve tube vent 132 to the second side of the balance diaphragm 126, along an inner surface of the outer shell 134 and an outer surface of the valve tube 106. For example, the gas path 130 may flow between the walls of the valve tube 106 and the outer shell 134, from the vent 132 down to the balance diaphragm 126.

As described above, gas arrives at the gas inlet 102. When the gas valve assembly 100 is de-energized/closed, the redundant valve 116 and the main valve 110 both block the flow path from the gas inlet 102 to the gas outlet 104. When the solenoid coil 124 is de-energized, there is no gas flow. And, the main and the redundant seals would both have to fail for there to be a leak to the gas outlet 104.

When the solenoid coil 124 is open, both the main and the redundant valves 110 and 116 are open and gas can flow to the gas outlet 104. Some gas may flow between the main and redundant valves 110 and 116 into the valve tube 106 (e.g., the redundant valve tube 106), then through the vent 132 in the top of the valve tube 106, and back down along the outside of the valve tube 106 to the back side of the balance diaphragm 126. When the solenoid coil 124 is de-energized, the valves 110 and 116 will return to the de-energized/closed state and no gas will flow.

The redundant spring 122 may be positioned outside of the valve tube 106, with the balance diaphragm 126 positioned between the redundant spring and the valve tube 106. A washer 136 may be used to facilitate sealing the balance diaphragm 126.

The gas flow path 130 may be adapted to allow a pressure at the first side to the balance diaphragm 126 to be substantially the same as a pressure at the second side of the balance diaphragm 126 (e.g., a difference of less than 0.1 psi, a difference of less than 1 psi, etc.). For example, as shown in FIGS. 1-3, the gas pressure may be substantially the same at the areas indicated by asterisks, on both sides of the balance diaphragm 126.

The shaft member 108 may include any suitable material, composition, etc. that moves in response to energization of the solenoid coil 124. For example, the shaft member 108 may include metal, any other suitable magnetic material, etc. In some embodiments, the shaft member 108 is an iron shaft (e.g., a spring-loaded iron shaft, etc.) positioned to move in response to the energization state of the solenoid coil 124 (e.g., as the solenoid coil 124 is energized, the iron shaft moves upwards to compress the main and redundant springs, etc.).

For example, as described above, the main spring and the redundant spring 122 may be positioned to respectively hold the main valve 110 and the redundant valve 116 in their respective closed positions when the solenoid coil 124 is not energized. The main valve member 114 may be adapted to contact the redundant valve member 120 as the main valve member 114 moves from its closed position to its open position (e.g., as solenoid coil 124 is energized to move the shaft member 108, etc.), to push the redundant valve member 120 from its closed position to its open position.

As described above, the main valve 110 may be connected to a spring-loaded iron shaft which resides inside the valve tube 106. When the solenoid coil 124 is energized the iron shaft is pulled upwards, thereby compressing the spring and opening the main valve 110. During opening, after moving a relatively short distance, the main valve 110 will come into contact with the redundant valve 116. The redundant valve 116 is connected to the valve tube 106 which may also be spring-loaded (e.g., via the redundant spring 122, etc.).

The redundant spring 122 is outside of the valve tube 106, as shown in FIGS. 1-3. During the opening stroke of the solenoid coil 124 and iron shaft, the main valve 110 and iron shaft will continue moving upwards pushing the redundant valve 116 and valve tube 106 upwards, thereby opening the redundant valve 116.

In view of the above, the solenoid coil 124 may be adapted to operate as a variable linear position actuator to vary a degree of opening of the main valve 110 and the redundant valve 116 in response to a variable current or voltage supplied to the solenoid coil 124, to modulate outlet pressure at the gas outlet 104. For example, the gas valve assembly 100 may not include any additional hardware for outlet pressure regulation downstream of the gas outlet 104.

In contrast, existing gas valve assemblies without balance diaphragms and without vented valve tubes may use the solenoid as an open/close type solenoid. When de-energized the valve is closed, and when energized the valve is fully open. In these open/close type valves, outlet pressure regulation is performed elsewhere in the valve with additional hardware. In some embodiments, a pressure sensing device may be located downstream of the main valve 110.

These existing gas valve assemblies may not work as variable position linear actuators, because effects of changing gas pressures during operation make the forces that counteract the solenoid coil variable, leading to unstable performance and oscillations.

The balance diaphragm 126 and gas path 130 described herein may allow the solenoid coil 124 to act as a stable variable linear position actuator to modulate outlet pressure of the gas. For example, the solenoid coil 124 may modulate the outlet pressure Pout at the gas outlet 104 by varying the current or voltage supplied to the solenoid coil 124, which may eliminate separate hardware needed for outlet pressure regulation.

Specifically, force curves for the main solenoid shaft versus its stroke indicate that the springs tend to force the shaft downward (e.g., towards the closed position), and inlet gas pressure also tends to close the shaft. In contrast, the outlet pressure tends to push the shaft open. These forces vary based on the inlet pressure and the outlet pressure.

Because outlet pressure is a function of shaft position, the force from the outlet pressure is also a function of shaft position. The gas path 130 allows outlet pressure gas flow to the back side of the diaphragm. This reduces (e.g., cancels out, etc.) the effect of outlet pressure forces on the shaft, and makes solenoid control more stable over the desired operating range (e.g., the entire operating range of inlet and outlet gas pressures).

For example, the gas inlet 102 may be adapted to receive an inlet flow of gas at any suitable inlet pressure Pin, such as a pressure between about 5.4 inches water column and 21 inches water column, etc. The gas outlet 104 may be adapted to supply an outlet flow of gas at any suitable outlet pressure Pout, such as a pressure between about 0 inches water column and 10 inches water column (e.g., a desired outlet pressure of 0.5 inches water column, etc.). In other embodiments, other inlet and outlet pressures may be used.

The balance diaphragm 126 may be adapted to inhibit a gas leak to the gas outlet 104 in response to a rupture of the balance diaphragm 126. For example, the opening 128 is positioned between the main valve member 114 and the redundant valve member 120.

If the balance diaphragm ruptures due to a high inlet pressure, and gas flow goes in the opposite direction through the gas path 130 from the vent 132 down the valve tube 106 and out the opening 128, the gas will still be inhibited by the main valve member 114 from exiting to the gas outlet 104.

The gas valve assembly 100 may be included in any suitable gas flow system, such as an HVAC system, etc. For example, an HVAC system may include the coaxial gas valve assembly 100, and at least one HVAC system component including a burner. The gas outlet 104 of the coaxial gas valve assembly 100 may be adapted to supply a flow of gas to the burner of the HVAC system component with a modulated outlet pressure.

Figure 4:
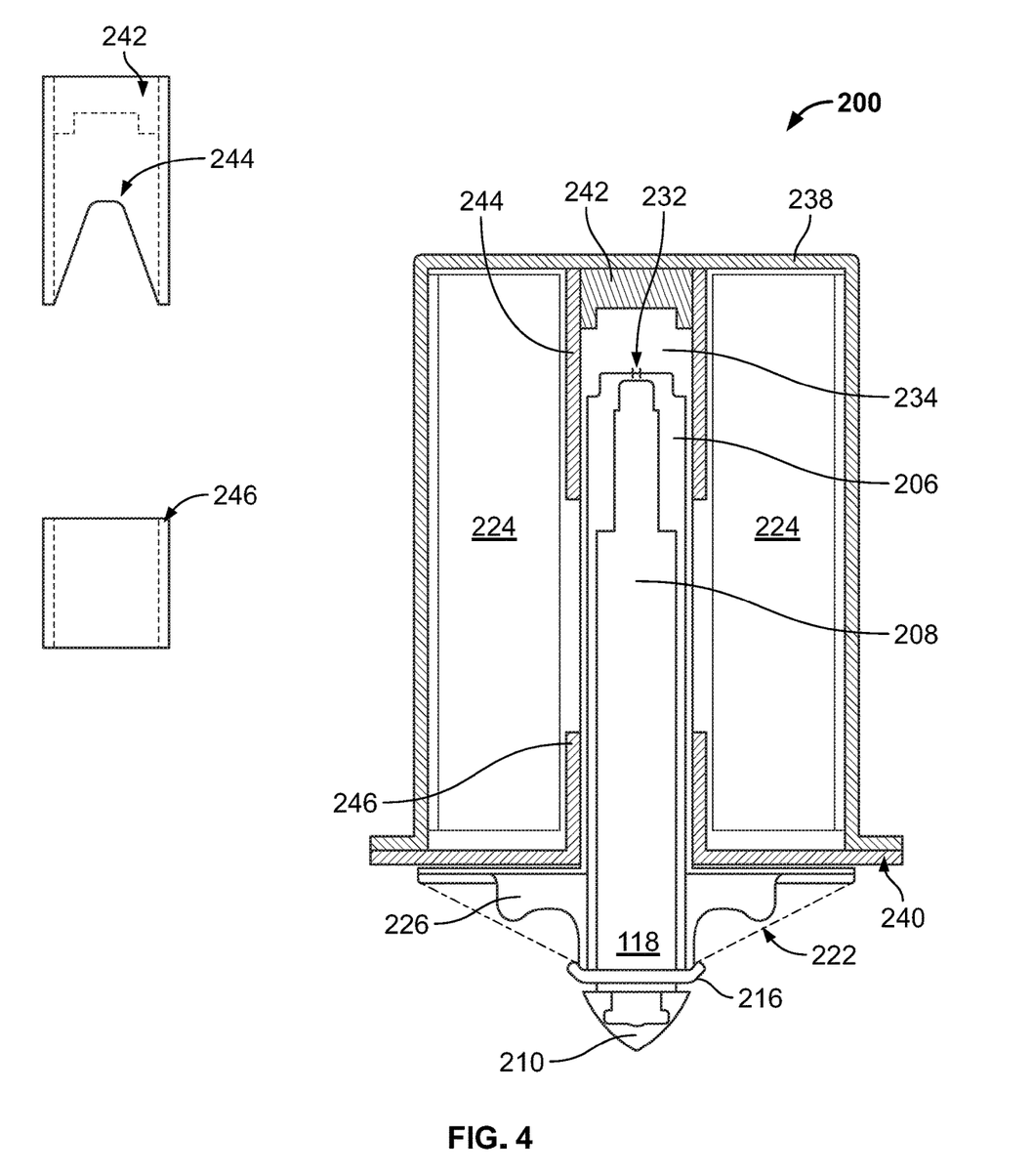
FIG. 4 is a cross-sectional view of an upper portion of a gas valve assembly according to another example embodiment of the present disclosure.

FIG. 4 illustrates an upper portion of coaxial gas valve assembly 200 including top and bottom sleeves according to another example embodiment of the present disclosure. The coaxial gas valve assembly 200 includes an inner valve tube 206, a main valve shaft 208, and an outer valve tube 234.

The shaft member 208 is positioned at least partially within the valve tube 206 (e.g., at least partially enclosed by the valve tube 206, at least partially housed by the valve tube 206, at least partially surrounded by the valve tube 206, etc.). The shaft member 208 is movable relative to the valve tube 206 (e.g., the shaft member 108 may move up and down, back and forth, etc., within the valve tube 206).

The gas valve assembly 200 includes a main valve 210 positioned on the shaft member 208. The main valve 210 is movable between a closed position and an open position (broadly, openable and closable). In the closed position, a member of the main valve 210 abuts a main valve seat (not shown) to inhibit gas flow through the main valve 210. In the open position, the member of the main valve 210 is spaced apart from the main valve seat to permit gas flow through the main valve 210.

The gas valve assembly 200 also includes a redundant valve 216 positioned on the inner valve tube 206 (e.g., coupled to an end of the valve tube 206, etc.). The redundant valve 216 is movable between a closed position and an open position (broadly, openable and closable). In the closed position, a member of the redundant valve 216 abuts a redundant valve seat (not shown) to inhibit gas flow through the redundant valve 216. In the open position, the member of the redundant valve member 216 is spaced apart from the redundant valve seat to permit gas flow through the redundant valve 216.

Although not illustrated in FIG. 4, the main and redundant valve seats, gas inlets and outlets, etc., may be similar to the corresponding components illustrated in the gas valve assembly 100 of FIGS. 1-3, or may have any other suitable inlet/outlet arrangements and valve seat arrangements.

As shown in FIG. 4, a redundant spring 222 (e.g., a conical spring, etc.) is positioned to resiliently bias the redundant valve 216 in its closed position. For example, the redundant spring 222 may be compressed and coupled to the redundant valve 216, the valve tube 206, etc., at a first end of the redundant spring 222, to push the redundant valve 216 towards the redundant valve seat.

The gas valve assembly 200 also includes a solenoid coil 224 positioned to electromagnetically move the shaft member 208 within the valve tube 206 according to an energization state of the solenoid coil 224, to open the main valve 210 and the redundant valve 216 to permit gas flow from the gas inlet to the gas outlet.

The gas valve assembly 200 further includes a balance diaphragm 226, which may be connected to the valve tube 206. The balance diaphragm 226 includes a first side in fluid communication with the gas inlet and/or the gas outlet, and a second side opposite the first side. A gas path through at least the inner valve tube 206 and outer valve tube 234 allows gas flow from the first side of the balance diaphragm 226 to the second side of the balance diaphragm 226 to reduce a pressure difference between the first and second sides of the balance diaphragm 226.

For example, gas may flow into an opening between the shaft member 208 and the inner valve tube 206 (e.g., due to small space(s) between the outer diameter wall of the main valve shaft 208 and the inner diameter wall of the inner valve tube 206, etc.).

The inner valve tube 206 may include a vent 232 that permits the gas to flow out of the inner valve tube 206 and into the outer valve tube 234. The gas may then flow down between the inner valve tube 206 and the outer valve tube 234 (e.g., between an outer diameter wall of the inner valve tube 206 and an inner diameter wall of the outer valve tube 234, etc.) to reach the back side of the balance diaphragm 226.

The solenoid coil 224 and a coil bobbin 236 may be housed in a bracket 238. The bracket 238 may secure the assembly 200 to another housing or other component of a gas powered device, etc., such as via a plate 240. Although FIG. 4 illustrates the balance diaphragm 226 as located within the spring 216, in other embodiments the balance diaphragm 226 may surround the spring 216 (e.g., the balance diaphragm 226 may be sealed against the plate 240 to inhibit gas flow, etc.). The balance diaphragm 226 may include any suitable material, such as silicone, nitrile, etc.

FIG. 4 illustrates an optional arrangement of a solid core 242, a top sleeve 244, and a bottom sleeve 246. On the upper left side of FIG. 4, a combination of the top sleeve 244 and solid core 242 is illustrated in isolation. On the lower left side of FIG. 4, the bottom sleeve 246 is illustrated in isolation.

As described further below, the top sleeve 244 and bottom sleeve 246 may facilitate approximation of a constant force curve for the shaft member 208 as it moves relative to the solenoid coil 224. For example, the top sleeve 244 and bottom sleeve 246 may create a hollow core where an air gap remains approximately constant as the main shaft 208 moves with respect to the solenoid coil 224, etc.

Figure 5:
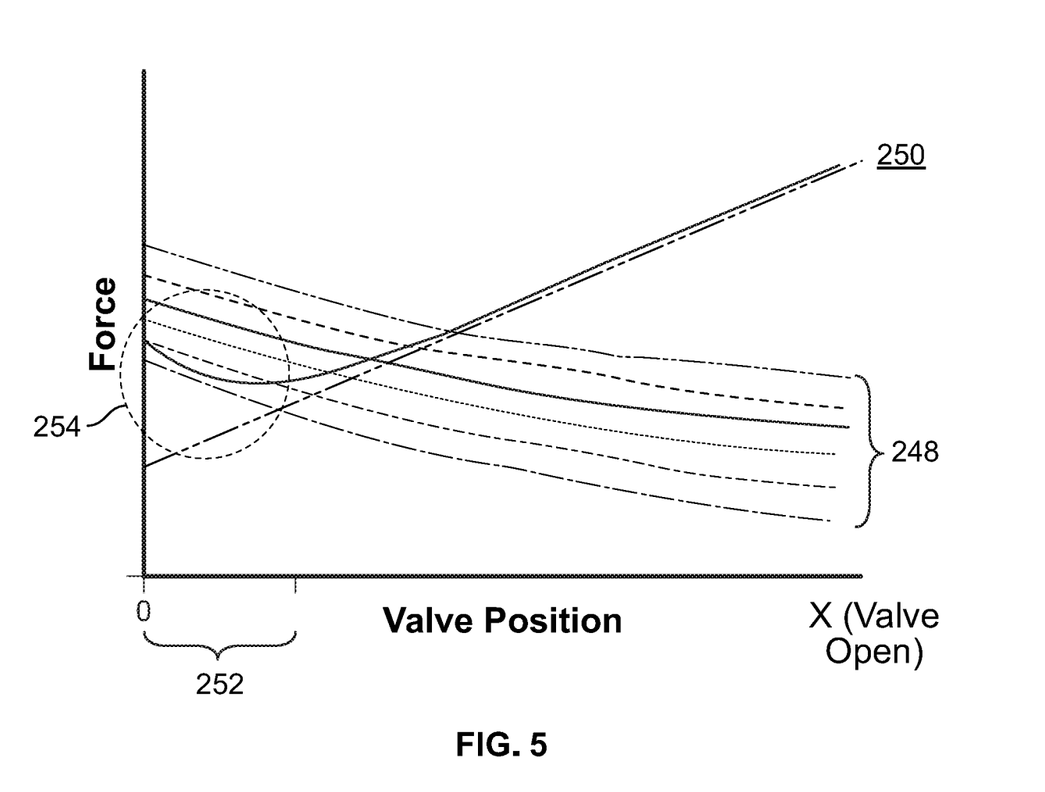
FIG. 5 is a graph of example valve force curves for the gas valve assembly of FIG. 1.

FIG. 5 illustrates example forces on the main valve 210 (e.g., on the main shaft 208 and components coupled to the main shaft 208, etc.) according to the position of the main valve 210. In FIG. 5, position zero indicates the main valve 210 is fully closed (e.g., the main shaft 208 is extended relative to the solenoid coil 224, etc.). Position 'X' indicates the main valve 210 is fully open (e.g., the main shaft 208 is received within the solenoid coil 224, etc.).

The force of the solenoid coil 224 attempts to move the main valve 210 to its open position (e.g., towards the X position, etc.). As shown in FIG. 5, the solenoid coil 224 may provide different force curves 248 depending on a strength of the current supplied to the solenoid coil 224, which, in turn, increases the electromagnetic force applied to the main shaft 208.

By varying the current between different set points, a specified force curve 248 can be selected in an effort to position the main valve 210 at a desired position between zero and X (e.g., the system may attempt to establish an equilibrium point for all forces on the main valve 210 that will result in the main valve 210 resting at the desired position between zero and X, etc.). As shown in FIG. 5, the force curves 248 may have negative slopes (e.g., due to the top and bottom sleeves 244 and 246, etc.) indicating that the force from the solenoid coil 224 decreases as the main valve 210 approaches the open position (which may be in contrast to other solenoid valves that increase force as the main shaft is received further within the solenoid coil).

In contrast to the force of the solenoid coil 224, the force of the spring 222 attempts to close the valve (e.g., push the valve towards its open position at zero, etc.). The force 250 of the spring 222 has a positive slope, as the spring force increases when the spring 222 compresses due to opening of the valve.

The main valve 210 also experiences force from gas pressures at the inlet (Pin) and the outlet (Pout). When the main valve 210 is closed, the force of the inlet pressure attempts to close the main valve. As the main valve 210 begins to open, the force of the inlet pressure reduces (e.g., because the gas is allowed to escape to the outlet, because the outlet pressure attempts to push the valve open, etc.).

After the main valve 210 has opened sufficiently, the gas pressure force on the main valve 210 is reduced to approximately zero, such that the main force on the valve is the force of the spring 222. This is illustrated in FIG. 5, where the load force 250 (e.g., the combined forces from the spring 222 and the gas pressure, etc.), drops off quickly during the initial range of valve movement at 252, then remains steady at the spring force slope for the remainder of the positions of the main valve 210. FIG. 5 illustrates a high inlet pressure example (e.g., about twenty one inches water column), with the balance diaphragm 226 removed.

At low inlet pressures (e.g., about seven inches water column, etc.), the coil force curves 248 may be strong enough to counter the load forces 250 and maintain a stable equilibrium of the force curves at an area 254 corresponding to the range at 252. At higher inlet pressures (e.g., about twenty one inches water column, etc.), some coil force curves 248 may not be strong enough to maintain a stable equilibrium in the area 254 as shown in FIG. 5. For example, if the gas inlet pressure is 21.0" and the specified outlet pressure is 0.3", the main valve 210 may be modulated to a position that is very close to 0 (e.g., the modulated position may be within the range 252), which may create an unstable equilibrium points in the area 254 if the balance diaphragm 226 is not present.

The instability of equilibrium points in the area 254 may not be due to the strength of the solenoid, because unstable equilibrium points may result at any valve position between 0 and X where the slope of the load force curve 250 is less than the slope of the coil force curves 248 curves. For example, the negative slope in the load force curve 250 near valve position 0 in FIG. 5 may create unstable equilibrium points in the area 254.

At low inlet pressures (e.g., around seven inches water column (iwc) etc.) the shape of the load force curve 250 may be different than what is illustrated in FIG. 5 (e.g., it may have primarily a positive slope, etc.), and the instability in the range 252 may not be present. For example, if there were no inlet pressure the load force curve 250 may only consist of the force from the spring 222 (e.g. the upward sloping dashed line). In this case the actuator may be stable at all positions between 0 and X.

As the inlet pressure rises from zero (and the balance diaphragm 226 is not present), the load force curve may start to approach the example load force curve 250 illustrated in FIG. 5. As inlet pressure is raised from zero iwc to twenty one iwc, the curl in the load force curve 250 may continue to increase in the area 254. In some embodiments, the load force at valve position zero (e.g., the location where the load force curve 250 crosses the y-axis) is increased as inlet pressure is increased, while the right side of the load force curve 250 (e.g., valve positions approaching fully open at X) will asymptotically approach the dashed spring line regardless the inlet pressure value.

As described above, at high inlet pressures (e.g., between eleven and twenty one iwc, etc.) the instability in the range 252 may be present because the load force curve 250 may have a negative slope near the valve position zero. The balance diaphragm may substantially return the load force curve 250 to the dashed line in FIG. 5 (e.g., which may represent only the spring force, etc.) by cancelling out the pressure forces. This may remove the unstable equilibria close to the zero position at even high inlet pressures.

For example, adding the balance diaphragm 226 may reduce the effects of the inlet pressure, including within the range 252 (e.g., by balancing out gas forces on the main valve 210 and/or the redundant valve 216 via the gas path though the vent 232, etc.). If the effects of the gas pressures are reduced during the range 252, the coil force curves 248 are better able to maintain a stable equilibrium for the position of the main valve 210 during the opening position range 252 even for higher inlet pressures.

According to another example embodiment of the present disclosure, a method of controlling a coaxial gas valve assembly is disclosed. The coaxial gas valve assembly includes a gas inlet, a gas outlet, a valve tube, a shaft member movable within the valve tube, a main valve including a main valve seat and a main valve member positioned on the shaft, a main spring positioned to resiliently bias the main valve in a closed position, a redundant valve including a redundant valve seat and a redundant valve member positioned on the valve tube, a redundant spring positioned to resiliently bias the redundant valve in a closed position, a solenoid coil, and a balance diaphragm.

The example method includes energizing the solenoid coil to electromagnetically move the shaft member within the tube according to an energization state of the solenoid coil, to open the main valve and the redundant valve to permit gas flow from the gas inlet to the gas outlet.

The main valve member is movable between a closed position and an open position. In the closed position, the main valve member abuts the main valve seat. In the open position, the main valve member is spaced apart from the main valve seat. The redundant valve member is movable between a closed position and an open position. In the closed position, the redundant valve member abuts the redundant valve seat. In the open position, the redundant valve member is spaced apart from the redundant valve seat.

The method also includes supplying gas flow through at least the valve tube from a first side of the balance diaphragm in fluid communication with the gas inlet and/or the gas outlet, to a second side of the balance diaphragm opposite the first side, to reduce a pressure difference between the first and second sides of the balance diaphragm.

The shaft member may define an opening in a side of the shaft member, with the opening positioned between the main valve member and the redundant valve member when the main valve and the redundant valve are in their closed positions. Supplying gas flow may include supplying gas flow into the opening and through the valve tube to the second side of the balance diaphragm to reduce the pressure difference between the first and second sides of the balance diaphragm.

In some embodiments, the redundant valve is positioned on a first end of the valve tube, the valve tube includes a vent at a second end of the valve tube opposite the first end, and supplying gas flow includes supplying gas flow out of the valve tube via the vent, to the second side of the balance diaphragm, to reduce the pressure difference between the first and second sides of the balance diaphragm.

The method may include inhibiting a gas leak to the gas outlet in response to a rupture of the balance diaphragm. Energizing the solenoid coil may include varying a current supplied to the solenoid coil to operate the solenoid coil as a variable linear position actuator to vary a degree of opening of the main valve and the redundant valve, to modulate outlet pressure at the gas outlet. In some embodiments, supplying gas flow includes balancing a pressure at the first side to the balance diaphragm to be the same as a pressure at the second side of the balance diaphragm.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A coaxial gas valve assembly comprising:
a gas inlet;
a gas outlet;
a valve tube;
a shaft member positioned at least partially within the valve tube and movable relative to the valve tube;
a main valve including a main valve seat and a main valve member positioned on the shaft member, the main valve member movable between:
a closed position in which the main valve member abuts the main valve seat to inhibit gas flow through the main valve; and
an open position in which the main valve member is spaced apart from the main valve seat to permit gas flow through the main valve;

a main spring positioned to resiliently bias the main valve member in its closed position; a redundant valve including a redundant valve seat and a redundant valve member positioned on the valve tube, the redundant valve member movable between:
  a closed position in which the redundant valve member abuts the redundant valve seat to inhibit gas flow through the redundant valve; and
  an open position in which the redundant valve member is spaced apart from the redundant valve seat to permit gas flow through the redundant valve;

a redundant spring positioned to resiliently bias the redundant valve member in its closed position;

a solenoid coil positioned to electromagnetically move the shaft member within the valve tube according to an energization state of the solenoid coil, to open the main valve and the redundant valve to permit gas flow from the gas inlet to the gas outlet; and a balance diaphragm connected to the valve tube, the balance diaphragm including a first side in fluid communication with the gas inlet and/or the gas outlet, and a second side opposite the first side, wherein a gas path through at least the valve tube allows gas flow from the first side of the balance diaphragm to the second side of the balance diaphragm to reduce a pressure difference between the first and second sides of the balance diaphragm wherein an opening is defined as a clearance between an outer circumference of the shaft member and an inner circumference of the valve tube, the opening positioned between the main valve member and the redundant valve member, the vent is located at an end of the valve tube opposite the opening; and the redundant valve is positioned on a first end of the valve tube; the valve tube includes a vent; and the gas path allows gas flow out of the valve tube via the vent, to the second side of the balance diaphragm, to reduce the pressure difference between the first and second sides of the balance diaphragm;

the redundant spring is positioned outside of the valve tube; and the balance diaphragm is positioned between the redundant spring and the valve tube.

2. The coaxial gas valve assembly of claim 1, further comprising an outer shell positioned to at least partially surround the second end of the valve tube, wherein the gas path allows gas flow from the valve tube vent to the second side of the balance diagram, along an inner surface of the outer shell and an outer surface of the valve tube.

3. The coaxial gas valve assembly of claim 1, wherein the shaft member comprises an iron shaft positioned to move in response to the energization state of the solenoid coil.

4. The coaxial gas valve assembly of claim 1, wherein the main valve member is adapted to contact the redundant valve member as the main valve member moves from its closed position to its open position, to push the redundant valve member from its closed position to its open position.

5. The coaxial gas valve assembly of claim 1, wherein:
  the gas inlet is adapted to receive an inlet flow of gas at an inlet pressure between 5.4 inches water column and 21 inches water column; and
  the gas outlet is adapted to supply an outlet flow of gas at an outlet pressure between 0 inches water column and 10 inches water column.

6. The coaxial gas valve assembly of claim 1, wherein the balance diaphragm is adapted to inhibit a gas leak to the gas outlet in response to a rupture of the balance diaphragm.

7. The coaxial gas valve assembly of claim 1, wherein the solenoid coil is adapted to operate as a variable linear position actuator to vary a degree of opening of the main valve and the redundant valve in response to a variable current supplied to the solenoid coil, to modulate outlet pressure at the gas outlet.

8. The coaxial gas valve assembly of claim 7, further comprising a pressure sensing device located downstream of the main valve.

9. The coaxial gas valve assembly of claim 1, wherein the gas path is adapted to allow a pressure at the first side to the balance diaphragm to be substantially the same as a pressure at the second side of the balance diaphragm.

10. An HVAC system comprising:
  the coaxial gas valve assembly of claim 1; and
  at least one HVAC system component including a burner, the gas outlet of the coaxial gas valve assembly adapted to supply a flow of gas to the burner of the HVAC system component with a modulated outlet pressure.

11. A method of controlling a coaxial gas valve assembly, the coaxial gas valve assembly including a gas inlet, a gas outlet, a valve tube, a shaft member movable within the valve tube, a main valve including a main valve seat and a main valve member positioned on the shaft member, a main spring positioned to resiliently bias the main valve member in a closed position, a redundant valve including a redundant valve seat and a redundant valve member positioned on the valve tube, a redundant spring positioned to resiliently bias the redundant valve member in a closed position, a solenoid coil, and a balance diaphragm connected to the valve tube, the method comprising:
  energizing the solenoid coil to electromagnetically move the shaft member within the tube according to an energization state of the solenoid coil, to open the main valve and the redundant valve to permit gas flow from the gas inlet to the gas outlet, the main valve member movable between a closed position where the main valve member abuts the main valve seat and an open position where the main valve member is spaced apart from the main valve seat, and the redundant valve member movable between a closed position where the redundant valve member abuts the redundant valve seat and an open position where the redundant valve member is spaced apart from the redundant valve seat; and
  supplying gas flow through at least the valve tube from a first side of the balance diaphragm in fluid communication with the gas inlet and/or the gas outlet, to a second side of the balance diaphragm opposite the first side, to reduce a pressure difference between the first and second sides of the balance diaphragm wherein:
  an opening is defined as a clearance between an outer circumference of the shaft member and an inner circumference of the valve tube, the opening positioned between the main valve member and the redundant valve member
  the redundant valve is positioned on a first end of the valve tube; the valve tube includes a vent;
  and supplying gas flow includes supplying gas flow out of the valve tube via the vent, to the second side of the balance diaphragm, to reduce the pressure difference between the first and second sides of the balance diaphragm;
  the redundant spring is positioned outside of the valve tube; and
  the balance diaphragm is positioned between the redundant spring and the valve tube.

12. The method of claim 11, further comprising inhibiting a gas leak to the gas outlet in response to a rupture of the balance diaphragm.

13. The method of claim 11, wherein energizing the solenoid coil includes varying a current supplied to the solenoid coil to operate the solenoid coil as a variable linear position actuator to vary a degree of opening of the main valve and the redundant valve, to modulate outlet pressure at the gas outlet.

14. The method of claim 11, wherein supplying gas flow includes balancing a pressure at the first side to the balance diaphragm to be the same as a pressure at the second side of the balance diaphragm.

* * * * *